(12) United States Patent
Woods

(10) Patent No.: US 11,666,038 B2
(45) Date of Patent: Jun. 6, 2023

(54) BREATHER-FEEDER INNER COVER

(71) Applicant: Abundant Harvest Apiary, Hadley, MA (US)

(72) Inventor: Rorie S Woods, Hadley, MA (US)

( * ) Notice: Subject to any disclaimer, the term of this patent is extended or adjusted under 35 U.S.C. 154(b) by 499 days.

(21) Appl. No.: 15/354,602

(22) Filed: Nov. 17, 2016

(65) Prior Publication Data

US 2017/0354127 A1    Dec. 14, 2017

Related U.S. Application Data

(60) Provisional application No. 62/392,788, filed on Jun. 11, 2016.

(51) Int. Cl.
    *A01K 47/06*      (2006.01)
    *A01K 53/00*      (2006.01)

(52) U.S. Cl.
    CPC .............. *A01K 47/06* (2013.01); *A01K 53/00* (2013.01)

(58) Field of Classification Search
    CPC ......... A01K 47/00; A01K 47/06; A01K 53/00
    USPC ........................................ 449/13, 14, 18, 26
    See application file for complete search history.

(56) References Cited

U.S. PATENT DOCUMENTS 8,764,512 B1 *   7/2014   Watson .................. A01K 47/06
                                                449/15

OTHER PUBLICATIONS

Endter, Beehive Inner Cover/Feeder, YouTube video, https://youtu.be/yzqQFXsSZww, Jan. 24, 2015 (Year: 2015).*
Burns et al., Lesson 41: 1000 Beekeepers in 2009 & Honey-B-Healthy, https://basicbeekeeping.wordpress.com/category/inner-cover/, Oct. 18, 2008 (Year: 2008).*

* cited by examiner

*Primary Examiner* — Daniel J Colilla
(74) *Attorney, Agent, or Firm* — Sarita Pickett; Patent Negotiator, PLLC

(57) ABSTRACT

An inner cover for a beehive and methods of making the inner cover in accordance with the present disclosure are primarily characterized by a substantially rigid base and a substantially rigid banding defining a volume within the inner cover. The base includes one or more ventilation openings which may optionally be covered by a screening material. The screening material, or the ventilation openings themselves, may be selectively blockable and unblockable by bees through the use of available materials such as propolis or beeswax. Self-variation by the bees of ventilation within the inner cover controls air circulation and temperature regulation, improving the survivability of the bees within a beehive as outside temperatures vary and allowing for year-round use. Food may be placed upon the ventilation openings, screening material, or surrounding structure, allowing bees to feed and regulate their environment without the risks of breaking cluster.

20 Claims, 14 Drawing Sheets

BREATHER-FEEDER INNER COVER

This application claims the priority of U.S. Provisional Patent Application No. 62/392,788 filed on Jun. 11, 2016, the disclosure of which is incorporated herein in its entirety.

BACKGROUND

The present disclosure relates generally to artificially made beehives. More particularly, the present disclosure relates to an inner cover which may be located above the upper hive box of a beehive, such as beneath the outer cover, and enables ventilation of the inner cover as well as enabling feeding of bees within the inner cover itself.

Artificial beehives are well known in the art. These beehives may be modular in design and often comprise one or more hive boxes, each permitting the creation of one or more combs by the bees. A hive box in such a beehive will often contain five, eight, or ten frames for honey combs. A common configuration of a beehive is known as a Langstroth hive. Such beehives may include a bottom board, a brood box, a honey super, an inner cover, and an outer cover, as well as other elements. An inner cover is often beneficial to minimize the effects of extreme heat or cold upon the bees and the beehive itself. The inner cover may also minimize the likelihood of condensation entering the beehive, or damaging it upon freezing therein. Inner covers often include an opening to allow for movement of and access by bees. The opening may be sized so as to aid the bees in defense against predators, such as by providing only a single narrow entrance pathway.

Current inner covers function, at best, as an insulator. Inner covers are maintained very shallow so as to create an insulating air space, thus restricting the movement of groupings or clusters of bees. Though dead air space may delay the effects of temperature change upon a beehive, there is no adequate variable temperature regulation provided by current hives. As bees require a narrow temperature band within which to thrive and maximize honey production, the life and output of a beehive are currently drastically affected by outside temperatures. Air circulation and ventilation are limited in current inner covers so as to maintain an insulating dead air space. However, such ventilation is constant. As a greater number of bees fill the inner cover in order to survive extreme temperatures, carbon dioxide and water vapor quantities also increase, due to bees consuming honey to survive times such as winter. The increased moisture condenses in the cold inner cover, potentially freezing the bees within. The moisture and increased condensation can also breed mold and mildew. Carbon dioxide may also damage the beehive population. The needs for ventilation of the inner cover not only change based on temperature, but also based upon genetic predisposition of the hive and the size of the hive cluster itself, which both may cycle and vary over time.

Bees regulate temperature during extreme weather conditions by forming a cluster, with the core of the cluster maintaining a temperature which attempts to be ideal for the survival of the hive. Due to the difficulties of surviving during adverse weather conditions, many beekeepers will place food for bees in the inner cover. Current inner covers, however, often require the bees to separate and break cluster in order to move to the food. As bees are forced to break away from the cluster in order to feed, their own temperature as well as that of cluster, and thus the hive itself, are negatively impacted.

SUMMARY

The disclosure relates to an improved beehive inner cover, also referred to here as the Breather-Feeder. The Breather-Feeder can maximize regulation of ventilation and temperature within the inner cover, and within the beehive itself, in response to changes in external temperatures and activity of a bee cluster. The improved inner cover can also improve feeding of the bees while minimizing breaking of cluster by the bees. The disclosure is concerned with improved ventilation openings in the inner cover that may be selectively sealed by the bees, both partially or entirely, and may also be selectively opened, as ventilation needs and temperature dictate. The improved ventilation openings and surrounding structure also enable feeding of the bees without requiring the bees to break cluster. The disclosure is also concerned with an improved side wall design for the inner cover which enables placement of food for the bees, also without requiring breaking of cluster, while preferably preventing creation of a comb in the inner cover. This allows for year-round use of the inner cover, without the need for removal, storage, or modification by a beekeeper, while also having multiple uses, including improved feeding. The disclosure also relates to a method of using the embodiments of the improved inner cover.

In a preferred embodiment, the inner cover has a substantially rectangular base with sidewalls along each of four sides, so as to be compatible with currently available beehive towers. It is understood that other shapes may also be used to fit varying beehive configurations. Some preferable sizes to be compatible with Langstroth hives include 19⅞" length and widths of 16 3/16", 13¾", or 9 3/16", though other sizes may be preferable for other types of beehives. The base may be made of a single piece of material or multiple pieces. The inner cover may be made of wood, plastic, metal, other materials, or combinations of materials. It is preferable that the base, at least one of the sidewalls, or both, are substantially rigid.

The base of the inner cover defines one or more openings which pass through the base. The one or more openings may, if sufficiently large, be screened with a screening material which is substantially permeable to air or other gases. The one or more openings may themselves be sized and configured so as to be selectively sealable by the bees themselves, using materials such as propolis, beeswax, or other available materials. The one or more openings may be unitary with the base, not requiring a separate compartment or structure to house and/or support the openings or screening material. The screening material may be permanently affixed to the base, and may cover or partially cover a single opening or multiple openings in the base.

The screening material may also be sized and configured so as to be selectively sealable by the bees, using materials such as propolis, beeswax, or other available materials. In this manner, as temperatures and populations fluctuate, the bees may decrease ventilation through the one or more openings by selectively blocking one or more openings or portions of screening material. The bees may also remove propolis, beeswax, or other blocking material so as to increase ventilation through one or more openings, such as at the end of a cold period. Increased ventilation may be used to aid in cooling a hive during warmer weather. Ventilation may be decreased in colder weather, and may be actively varied to account for fluctuating gas circulation needs. Separate portions of screening material may be covered or otherwise blocked, an entire opening may be covered or blocked, or an opening may be left entirely uncovered and not blocked. Ventilation may also be actively varied by the members of the hive as the characteristics and size of the hive population change over time, requiring changing gas circulation. The inner cover may thus be used year-round, across a wide range of temperatures, without the need for removal, storage, or modification by the beekeeper.

In a preferred embodiment, the screening material may be made of a material which has a rigidity or tensile strength, or is affixed in a configuration, sufficient to withstand movement of the bees or placement of food upon the screening material. By using a sufficiently strong screening material, food may be placed directly over the opening, permitting a bee cluster to feed while regulating ventilation and its own temperature, thus minimizing the need for individual bees to break cluster. Nutrients may also be placed on the structure surrounding the screening material or openings. Wood, plastic, metals, fabric, or other materials may be used for screening or for the base itself. In a preferred embodiment, steel screening may be used. It is further preferable to paint or otherwise coat at least the top surface of the screening if it may be subject to oxidation, such as with steel, or if the material may be a source of concern for itself endangering or causing health risks to the bees. It may be preferable for the bees to not have direct surface contact with some materials, such as aluminum. It is, however, understood that the screening material may be a mesh, a fabric, or any other material with openings or that is otherwise permeable to gases such as air.

In one embodiment, the base of the inner cover may define four holes. Each hole may be substantially located in a different quadrant of the base. In a further preferred embodiment, the openings may be substantially circular. In larger embodiments, the holes may be approximately 5" in diameter. Such sizing is beneficial for permitting significant volumes of air circulation for larger hives, such as ten frame boxes, though a larger number of smaller openings may also be used. Smaller openings, such as 4" diameters, may be used for smaller hives, such as those with eight frame boxes. Embodiments with smaller holes, or fewer holes, may also be used for smaller hives, such as those with five frame boxes. In an alternate embodiment, the base of the frame defines a single opening, which may be located at the back of the inner cover. In another alternate embodiment, the base of the frame may define openings of different sizes, such as larger openings in the back of the inner cover than are in the front, or the inverse.

It is understood that other sizes of openings may also be used, including combinations of different sizes. The openings may be holes which are at least partially covered with a screening material, or may be one or more groupings of through-holes in the base of the inner cover itself. All, some, or none of the openings may be entirely or partially covered by a screening material, and the openings may themselves be sized and configured so as to be selectively blockable and unblockable by bees.

In a further preferred embodiment, the sidewalls of the inner cover form a perimeter banding which is sized so as to permit the placement of food within the inner chamber. An upper volume is defined by the banding within the inner cover wherein food, such as sugar syrup, pollen patties, sugar cubes, bags of syrup, or other forms of nourishment may be fed to the bees. In such an embodiment, the banding is sized so as to permit stacking of the food for the bees. The upper volume is preferably sized so as to permit placement of nutrients on the screening material, on openings, or on the surrounding structure, so as to permit a variety of food types to be fed without necessity breaking of cluster by bees. The upper volume is also preferably sized so as to minimize the likelihood of condensation, which may have gathered on the outside or the walls of the outer cover, dripping or otherwise entering into the beehive. The upper volume is also preferably sized so as to improve circulation of air within the inner cover.

In a preferred embodiment, the upper volume is configured so as to permit feeding of the bees while preventing formation of a comb within the inner cover. In a further preferred embodiment, the banding is in the height range of approximately 1 "to approximately 2½" above the top surface of the base or screening material. Different heights of banding may be preferable for different feeding preferences. A maximum height of 2½" may be preferable to discourage the bees from building a comb in the inner cover.

In another embodiment, the banding may have one or more supplemental openings which permit access and egress for bees. The supplemental openings in the banding are beneficial in warmer weather conditions, where there is increased honey production, thus there may be higher numbers of bees in the beehive population and more travel of bees may be necessary. The supplemental openings in the banding may be sized or otherwise configured to minimize passage of predators into the beehive, thus improving the ability of the hive to defend itself against predators despite an increased number of openings. The supplemental openings in the banding may be configured so as to be closed in colder temperatures, such as through the use of a flap or door. The supplemental openings in the banding may also be sized so as to be filled, such as with grass or a plug, so as to restrict movement and ventilation during colder temperatures. In one embodiment, the supplemental openings in the banding may be sized so as to be blocked by the bees during colder weather, such as with propolis or beeswax. In a preferred embodiment, the supplemental openings in the banding are substantially circular. In a further preferred embodiment, the supplemental openings in the banding are approximately 7/16" in diameter. In a preferred embodiment, the supplemental openings in the banding are defined by one or more of the sides of the inner cover. The front of the inner cover may define an opening as well, though this opening may be of a different size or shape from the supplemental openings in the banding. The supplemental openings may also not be included in the banding at all, or may be filled or otherwise closed off, such as when using an inner cover for bee nucleus colonies. Supplemental openings, as well as the opening in the front of the cover, may be defined by the sidewalls and banding or by gaps between the banding and the base.

Openings in the front and/or sidewalls of the inner cover allow for condensation, which may form on the underside of an outer cover, to be harvested by the bees from the hive. As bees run out of honey stores, such as during periods of cold weather, they need to feed on nutrients provided in forms such as carb patties or blocks of sugar. This type of food supply must be moistened in order to be edible by the bees, though the cold periods which typically require this type of feeding are also too cold for bees to fly and travel to gather water. Access to condensation under the outer cover, from the inner cover, allows bees to readily acquire water and thus be able to eat nutrients which have been provided for them.

The Breather-Feeder may also be used in combination with hive-wrapping materials. In such an embodiment, the beehive benefits from insulation as well as ventilation of the beehive and the inner cover, thus improving temperature self-regulation as well as minimizing condensation and associated risks.

It is to be understood that the above mentioned features and the features yet to be explained hereinafter can be used not only in the respectively mentioned combinations but also in other combinations or alone without departing from the context of the present invention.

BRIEF DESCRIPTION OF THE DRAWINGS

The invention is now disclosed in detail with reference to exemplary embodiments shown in the accompanying drawings, where.

DETAILED DESCRIPTION

Exemplary embodiments of the disclosure are illustrated in the Figures and are explained in the following description in more detail, wherein identical reference numbers refer to identical, or similar, or functionally identical components.

Figure 1:
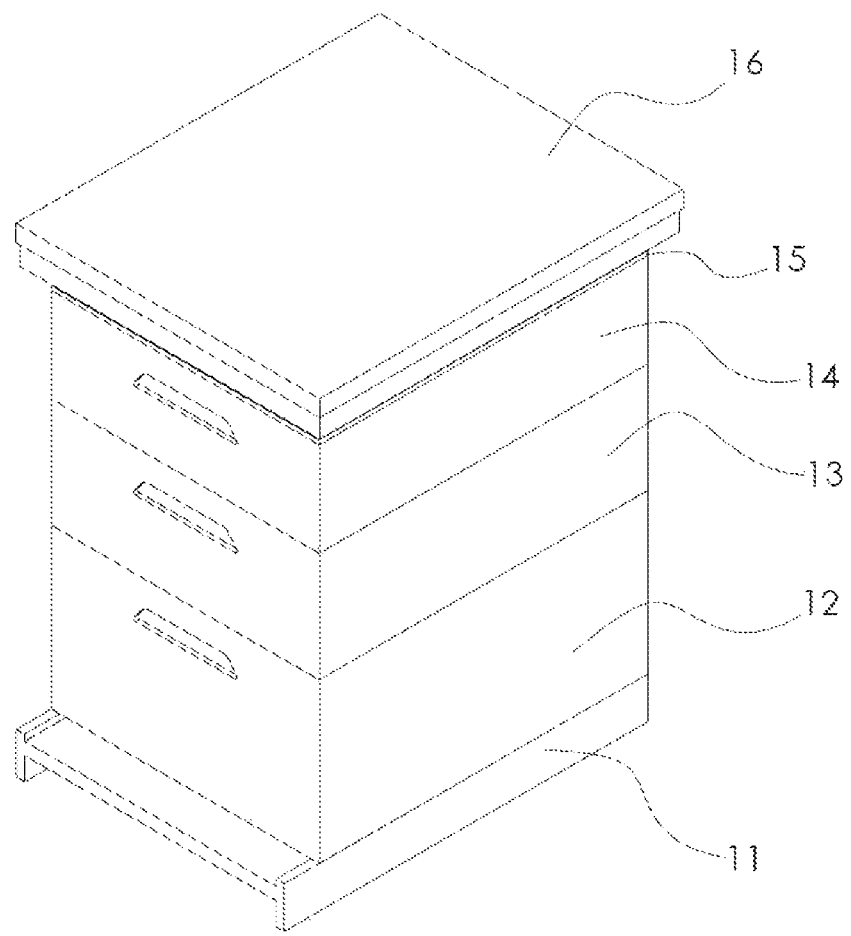
FIG. 1 shows an isometric view of a hive which includes an embodiment of an inner cover of the present disclosure.

FIG. 1 shows an isometric view of an exemplary hive 10, such as of the Langstroth type, illustrating a possible use for the inner cover 15 of the present disclosure. The inner cover 15 may be used with other types of hives as well. The hive 10 shown in FIG. 1 may include a bottom board 11, which may be screened. The hive 10 also may include a deep box 12, such as for use as a deep brood chamber, a medium chamber 13, a super 14, an inner cover 15, and an outer cover 16. Additional supers 14 may also be used. Fewer, additional, or alternate components may also be used with the hive 10, such as for other types of hives or to modify the hive 10 to meet the preferences or needs of the beekeeper.

Figure 2:
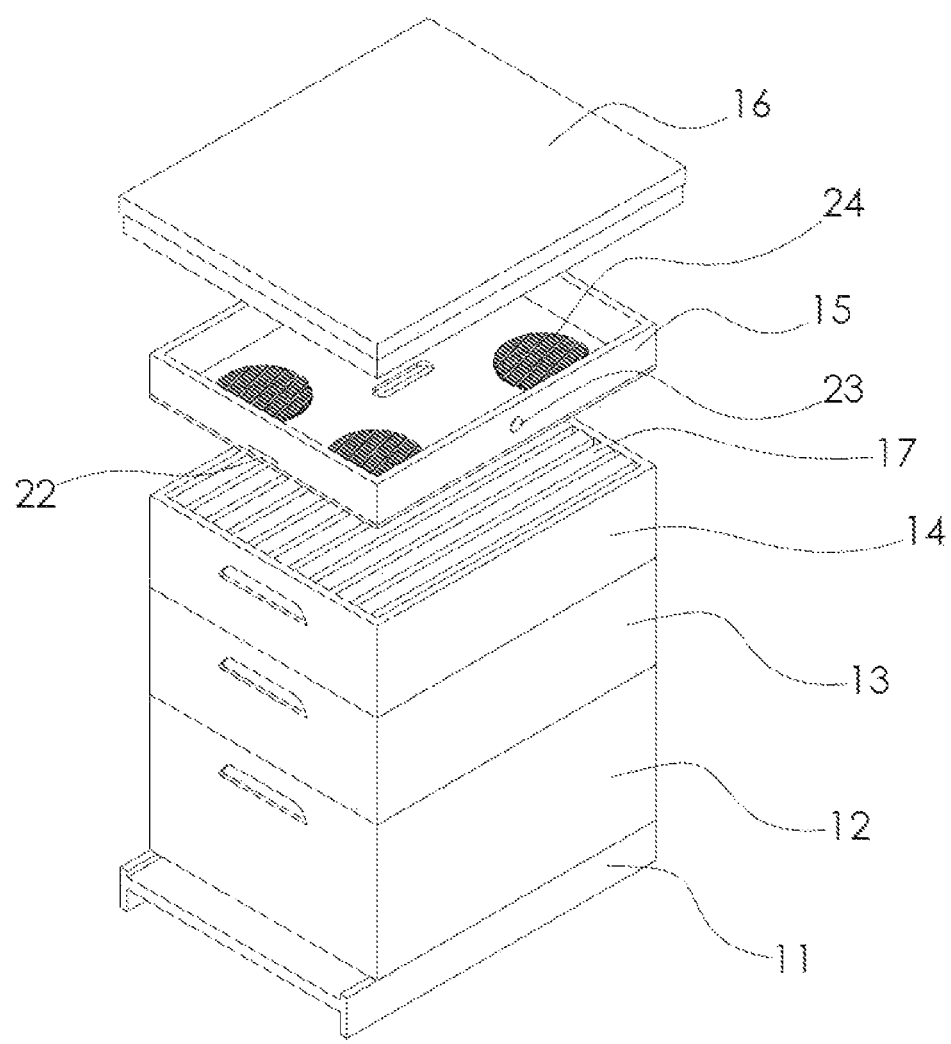
FIG. 2 shows an exploded isometric view of the hive of FIG. 1, showing an embodiment of an inner cover of the present disclosure.
Figure 3:
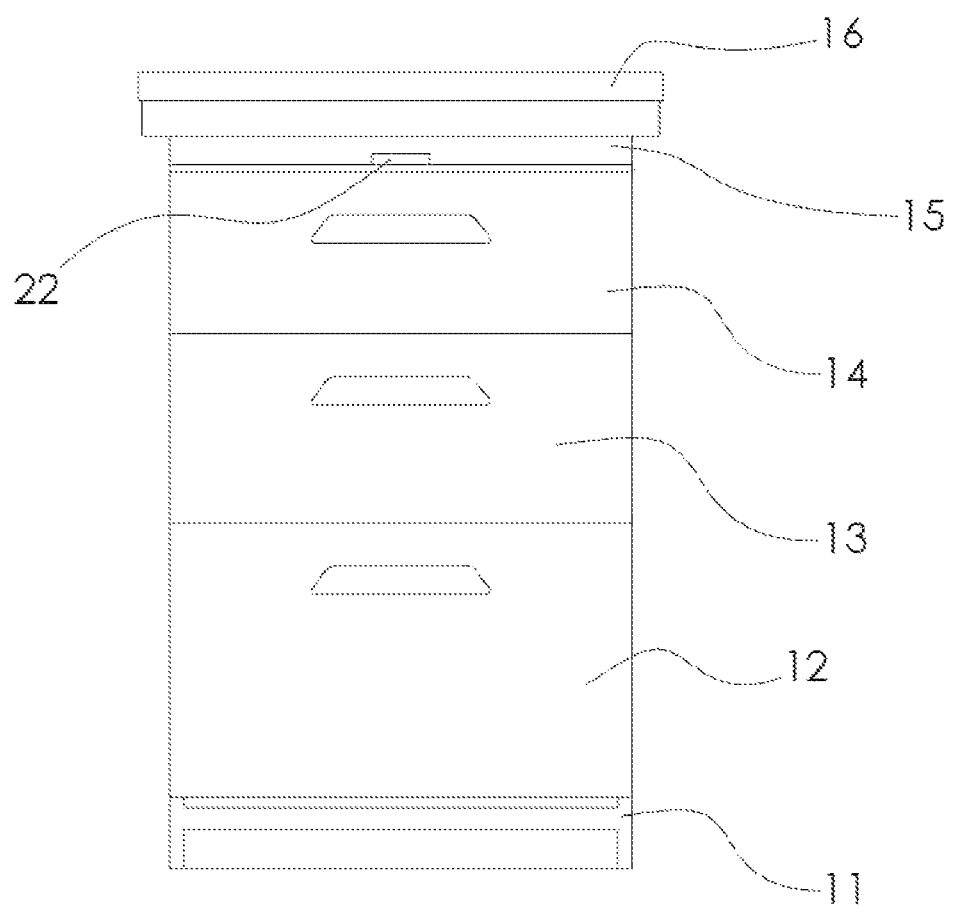
FIG. 3 shows a front view of the hive of FIG. 1.

FIG. 2 shows an exploded view of the exemplary hive 10 of FIG. 1, showing an embodiment of the inner cover 15 of the present disclosure. FIG. 3 shows a front view of the exemplary hive of FIG. 1. In the embodiment of the inner cover 15 shown in FIG. 3, the banding 20 is sufficiently tall so that the outer cover 16 does not fully block the inner cover 15 from the front or side. It is understood, however, that other heights of banding 20 may be used with the inner cover 15, thus blocking more or less of the inner cover 15.

Figure 4:
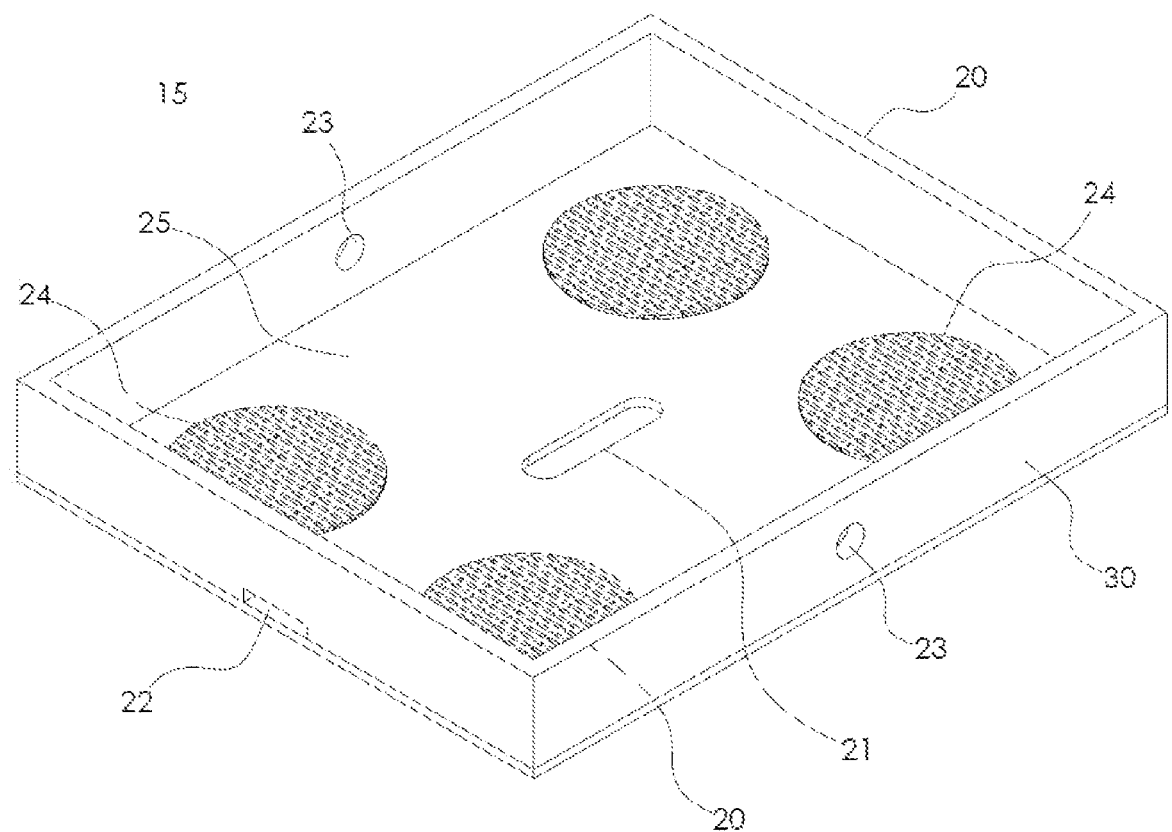
FIG. 4 shows an isometric view of one embodiment of an inner cover which includes openings and screening material of the present disclosure.

FIG. 4 shows an isometric view of an embodiment of an inner cover 15 comprising a base 25 and banding 20 according to aspects of the disclosure. The base 25 is substantially rectangular and, in a preferred embodiment, is 19⅞" long and 16 3/16" wide, though other dimensions may be preferable for various beehives. Other embodiments may include, but are not limited to, widths of 13¾", or 9 3/16 ". The base 25 is preferably ¼" to ⅜" thick, though it is understood that this thickness may be varied and may be thicker or thinner so as to achieve preferred rigidity, depending on the materials used. Preferred materials include solid wood, plywood, and plastics. The base 25 may be formed of a single piece of material, or may comprise multiple smaller sections, including those of differing materials. The base 25 may define a central opening 21, which is located and sized so as to permit movement of bees from the beehive up and into the inner cover 15.

The base 25 defines one or more openings 27. The openings 27 pass through the base 25 so as to permit the movement of gases and ventilation between the inner cover 15 and the beehive below. Openings 27 may be sized to allow for sufficient ventilation of the inner cover 15 while also being small enough to have the ventilation appropriately restricted by the bees in colder weather. Larger bases 25 may use a plurality of openings 27. In the embodiment shown in FIG. 4, the base 25 defines four openings 27. The openings 27 may be substantially circular and may, in one preferred embodiment, be approximately 5" in diameter. The openings 27 in the embodiment in FIG. 4 are substantially covered by a screening material 24. The screening material 24 may be a plastic, a fabric, metal, or other material which permits the passage of air. The screening material 24 is also configured so as to be able to be selectively covered or blocked by the bees, such as through the use of propolis or beeswax. Holes may be sized so as to be able to be blocked or unblocked by the bees. For some materials, such as certain metals, it may be preferable to paint or otherwise coat at least the top surface of the screening material 24 so as to prevent or minimize direct contact between the bees and the screening material 24.

In the embodiment shown in FIG. 4, the inner cover 15 also includes a banding 20 projecting substantially upward and away from the base 25. The banding 20 preferably encloses substantially all sides of the inner cover 15 and preferably at least partially defines a front opening 22. The front opening 22 is configured so as to permit access for bees directly in and out of the beehive from the inner cover 15. In the embodiment shown in FIG. 4, the banding 30 is sized so as to permit the placement of food for the bees on the base 25 and/or on the screening material 24. In a preferred embodiment, the banding 20 is at least 1¼" tall, so as to permit placement of food within the inner cover 15 on a top surface of the base 25, while also permitting movement of a bee cluster to the food or the screening material 24. It is preferable that the base 25 and the screening material 24 be selected, configured, and affixed so as to be able to support the food and a bee cluster. Survival of bee populations during extreme weather conditions is improved if they are able to feed and block or open ventilation paths without having to break cluster. It is also preferred that the banding 30 is no taller than 2½", so as do dissuade bees from forming a comb within the inner cover.

The embodiment in FIG. 4 includes one or more supplemental openings 23. The supplemental openings 23 are defined by sidewalls 30 within the banding 20, though supplemental openings 23 may also be located elsewhere in the inner cover 15, such as the back of the banding 20. The supplemental openings 23 provide additional access or exits for bees at times when there is greater honey production or when the bee population is larger, such as during warmer temperatures. The supplemental openings 23 may be drilled through the sidewalls 30, and should be sized to allow proper passage of bees. The supplemental openings 23 are preferably also sized to as to minimize entrance of predators, or to allow the bees to defend against such entrance. In a preferred embodiment, the supplemental openings 23 are substantially circular and are 7/16" in diameter.

Figure 5:
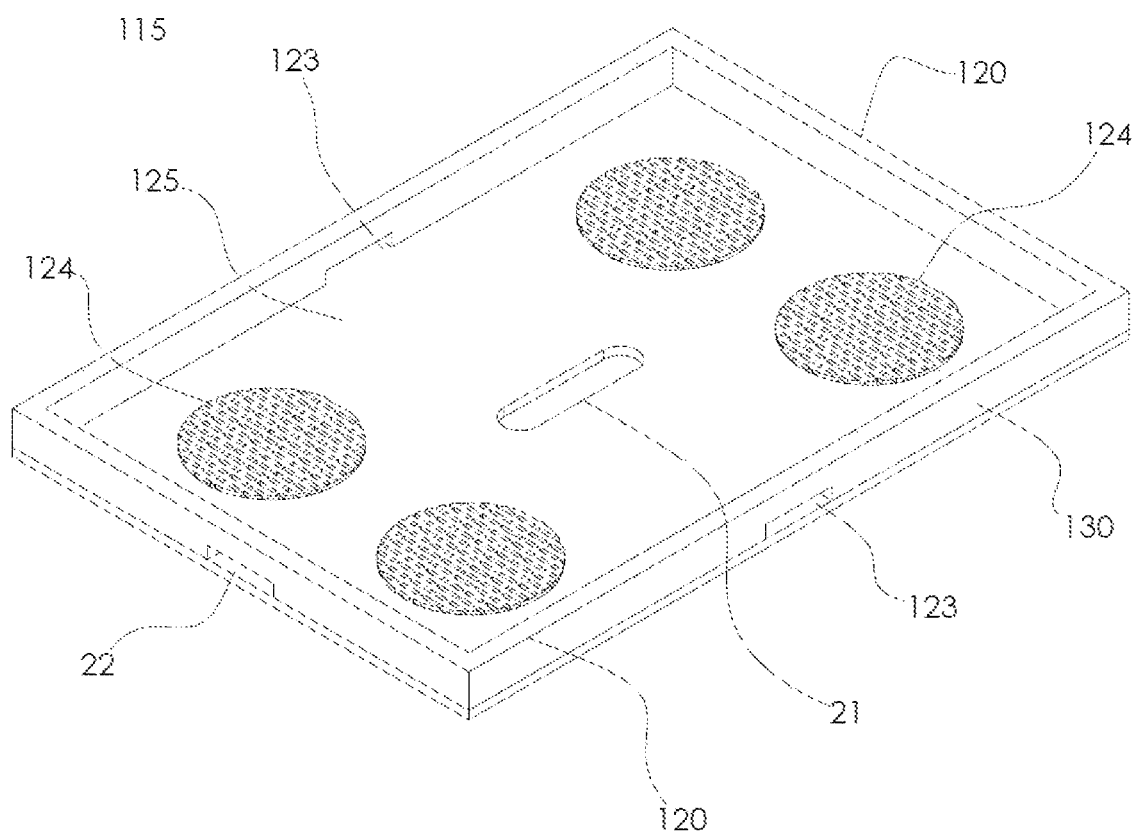
FIG. 5 shows an isometric view of an alternate embodiment of the inner cover of the present disclosure.

FIG. 5 shows an isometric view of an alternate embodiment of the inner cover 115. In this embodiment, the banding 120 and sidewalls 130 are sized so as to allow for food which does not require as much room as that in FIG. 4. The supplemental openings 123 in this embodiment are substantially rectangular and are defined by a gap in the banding 120 and bounded by the base 125. The embodiment in FIG. 5 comprises a smaller base 125 than the base 25 of the embodiment of FIG. 4, which may be sized to fit an 8 frame beehive, instead of the 15 frame beehive of FIG. 4. A smaller base 125 may define fewer openings 27, or the openings 27 may themselves be smaller. In a preferred embodiment, the opening 27 are substantially circular and are approximately 4" in diameter. Smaller openings 27 allow for a smaller screening material 124, though it is also possible to use a single size screening material 124 for various diameters, shapes, or numbers of openings 27.

Figure 6:
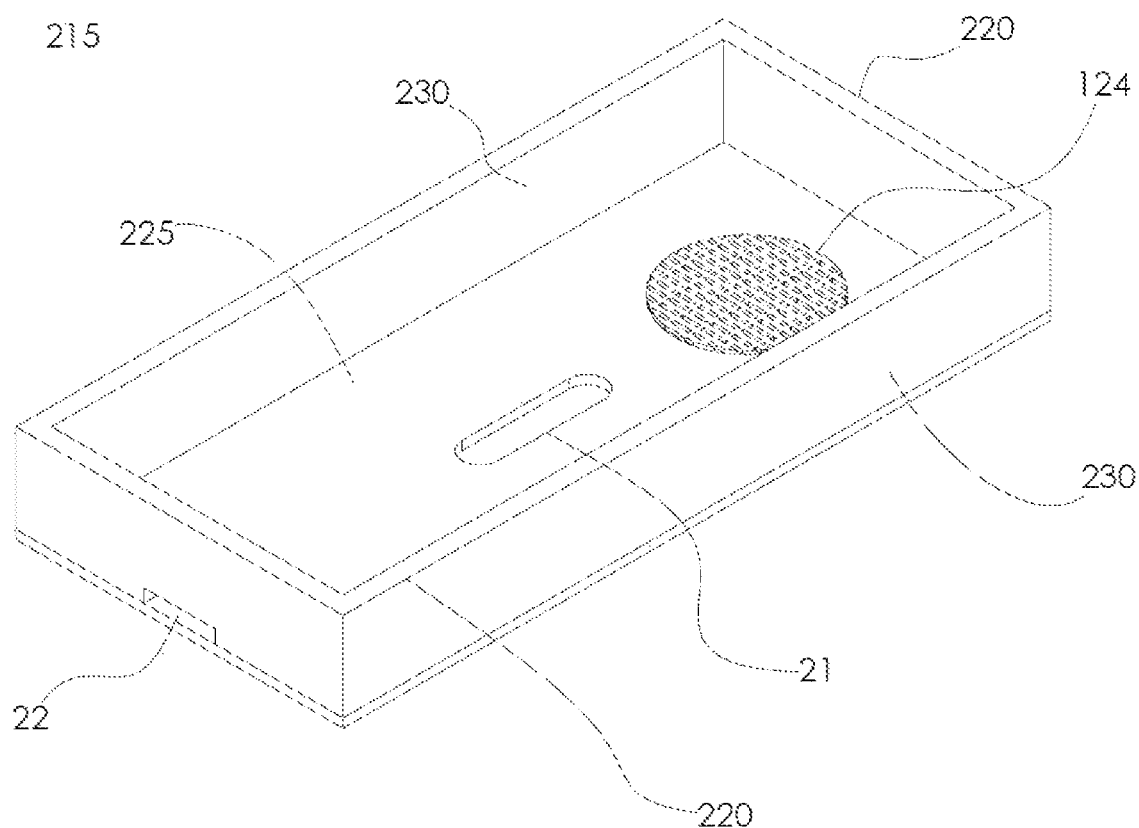
FIG. 6 shows an isometric view of another embodiment of the inner cover of the present disclosure.

FIG. 6 shows an isometric view of an alternate and narrower inner cover 215, such as that used for five frame beehives. In the embodiment shown, the sidewalls 230 of the banding 220 substantially match the length of the base 225, which may be as long as the embodiments of FIGS. 1 & 2 despite being narrower. The base 225, due to reduced width, may only require a single opening 27, with a single section of screening material 124.

Figure 7:
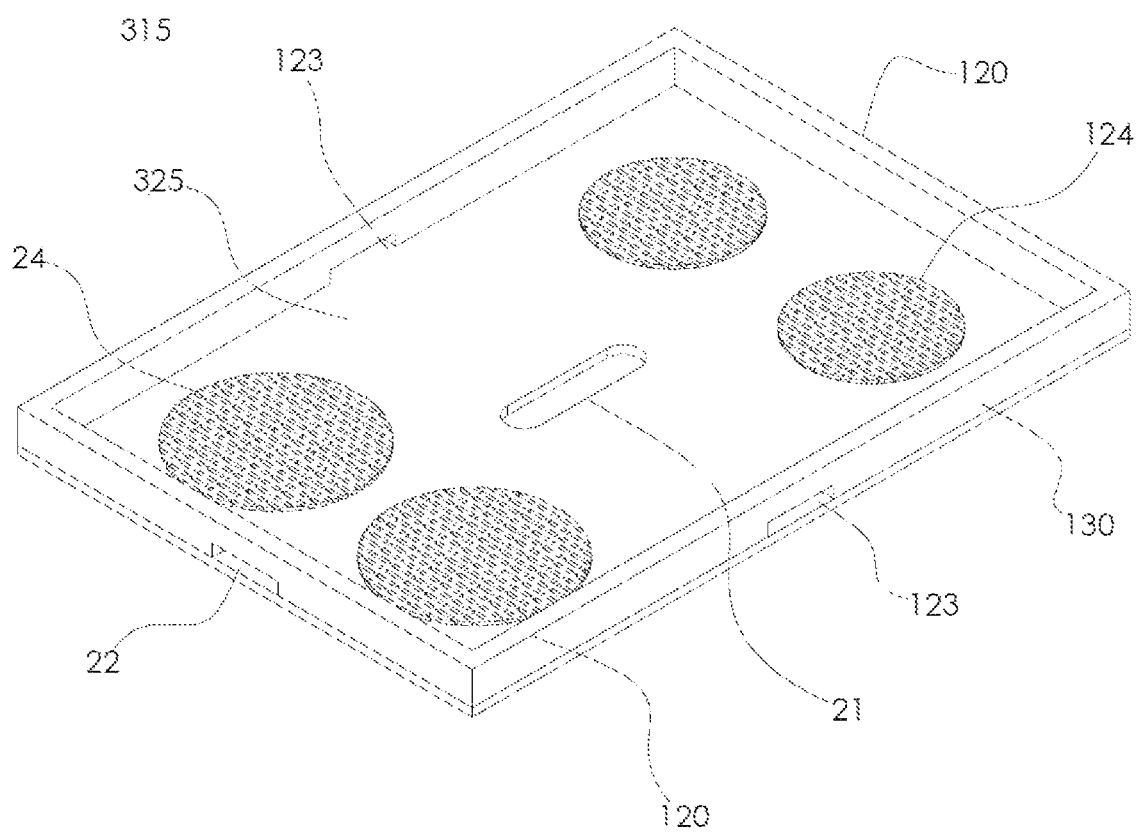
FIG. 7 shows an isometric view of an alternate embodiment of the inner cover of the present disclosure, including openings of different sizes.

FIG. 7 shows an isometric view of an inner cover 315 where the base defines openings 27 of different sizes. Depending on preferred feeding materials and patterns, larger or smaller openings 27 may be located in the front or back of the base 325. The embodiment of FIG. 7 shows larger openings, such as 5", and screening material 24 towards the front of the inner cover 315, with smaller openings, such as 4", and screening material 124 towards the rear of the inner cover 315.

Figure 8:
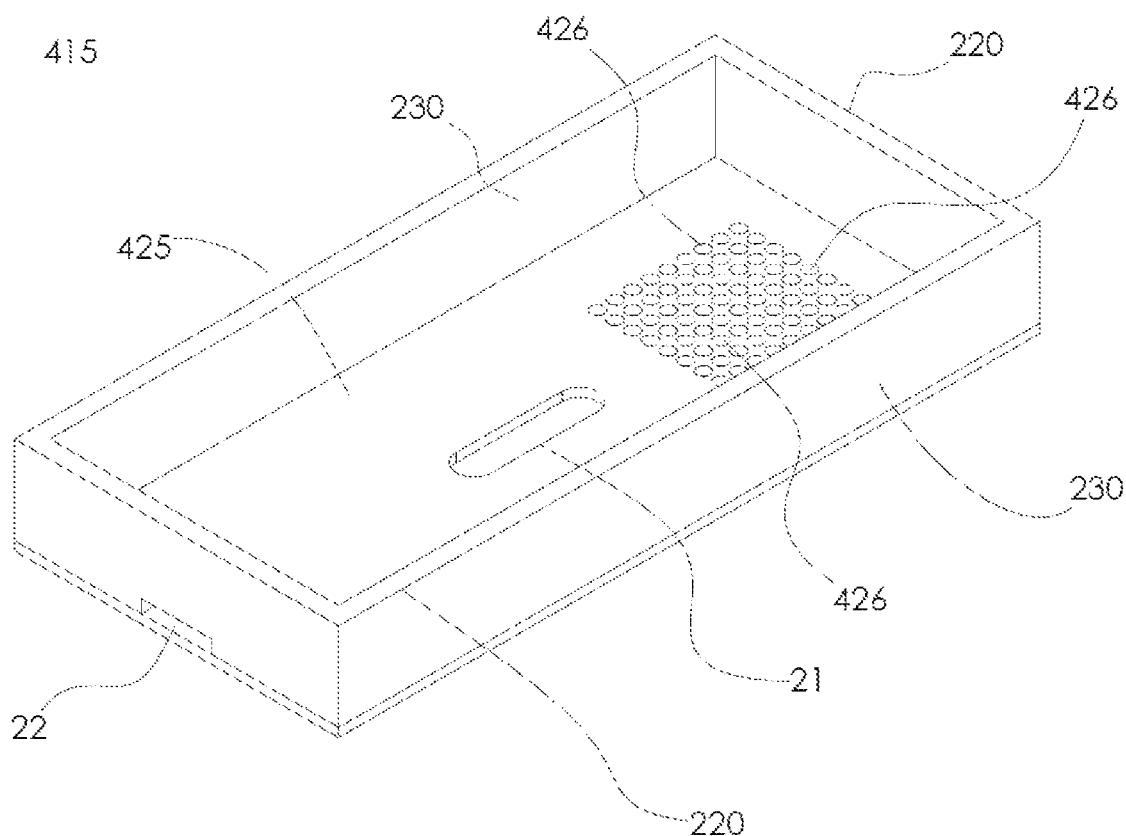
FIG. 8 shows an isometric view of an alternate embodiment of the inner cover of the present disclosure, including a plurality of openings configured so as to not require a separate screening material.

FIG. 8 shows an isometric view of an embodiment of the inner cover 415 which does not require screening material. In the embodiment shown, the base 425 comprises one or more openings 426. These openings 426 may be distant from each other, or they may be located in one or more groupings. The openings 426 are sized such that they may be partially or entirely blocked off by bees using propolis or beeswax. If molding the base 425 out of plastic, such as to reduce manufacturing costs, forming a plurality of openings 426 in the base 425 such that no separate screening material is required may have further cost-saving benefits. It may also be preferable to make the base 425 or the inner cover 415 unitary. The plurality of openings 426 may be provided through a means such a drilling or molding, eliminating the need for separate screening components.

Figure 9:
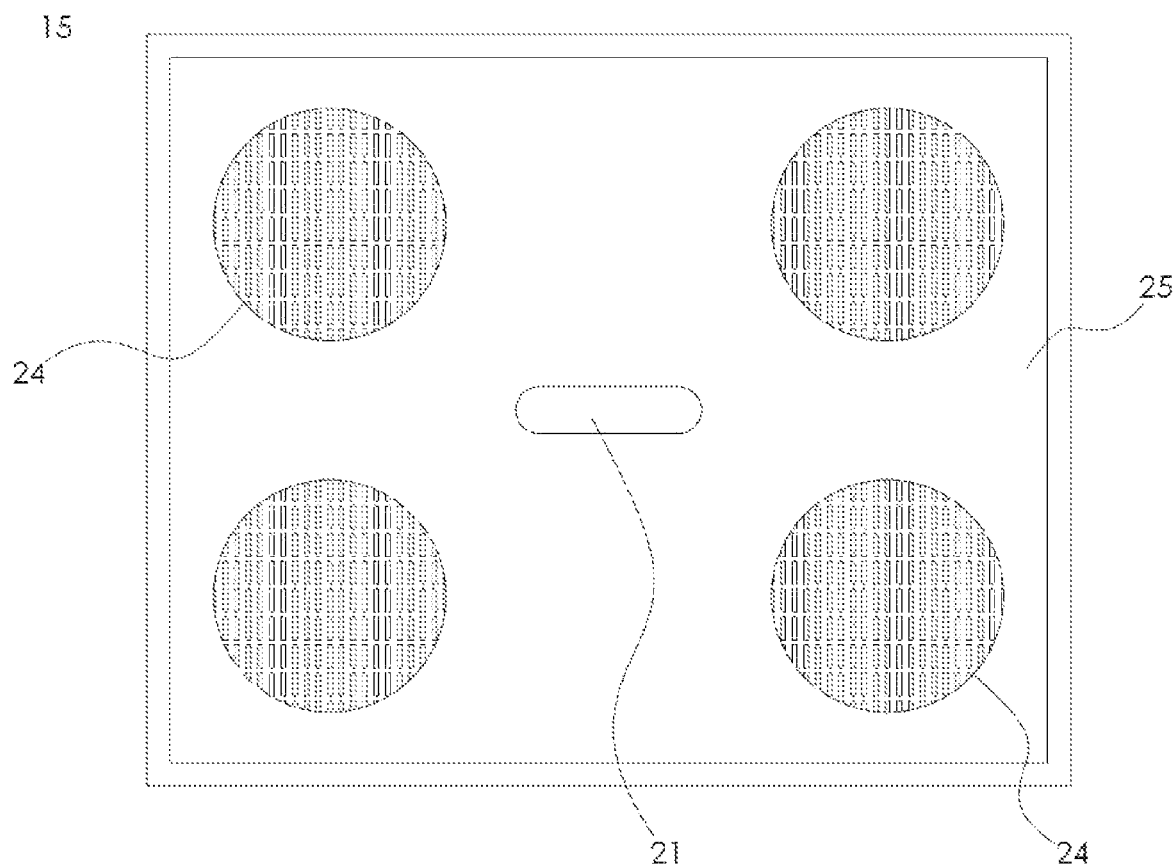
FIG. 9 shows a top view of the embodiment of FIG. 4.
Figure 10:
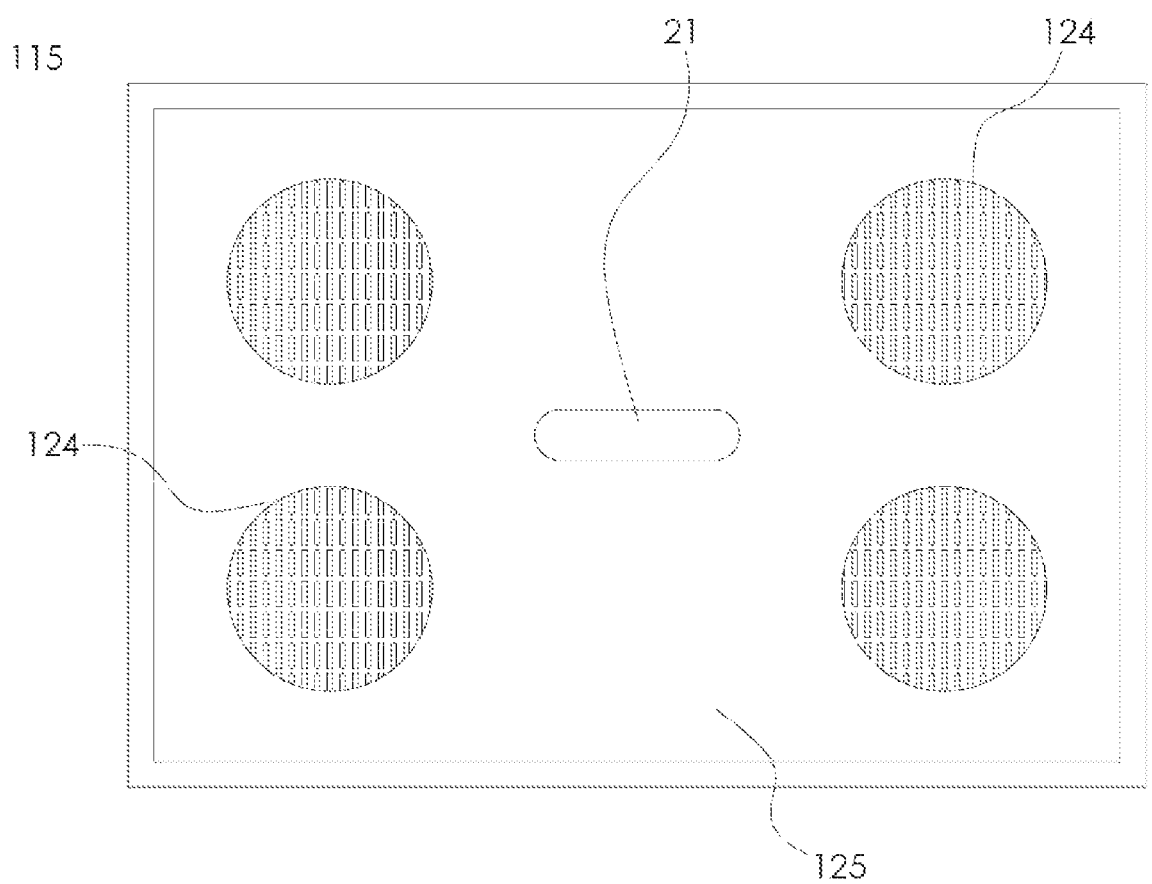
FIG. 10 shows a top view of the embodiment of FIG. 5.
Figure 11:
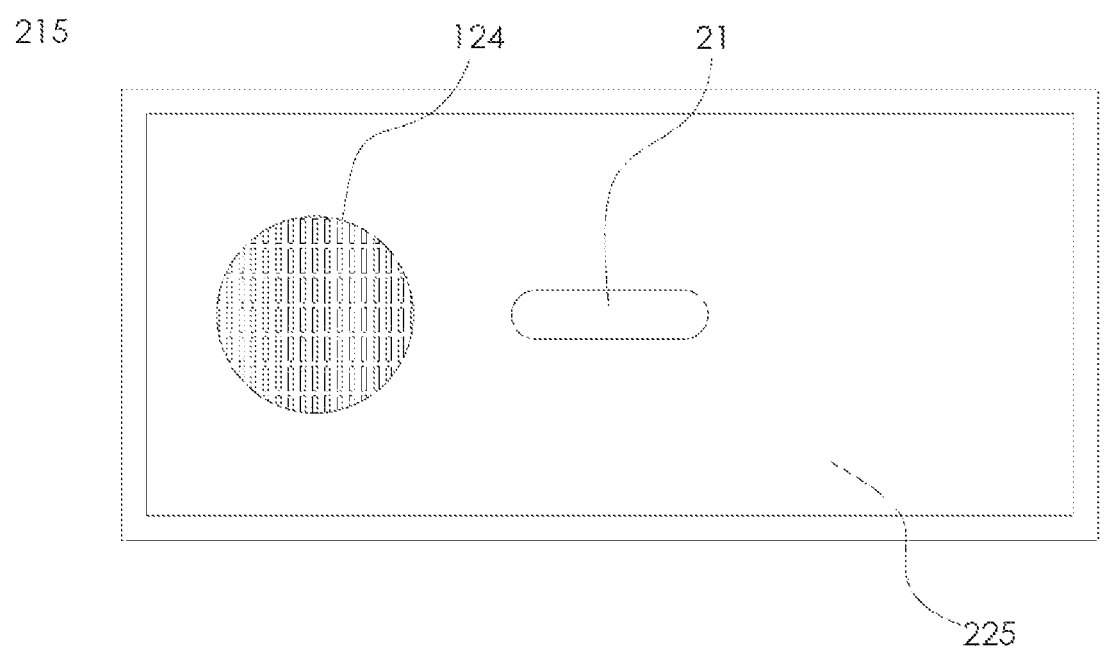
FIG. 11 shows a top view of the embodiment of FIG. 6.
Figure 12:
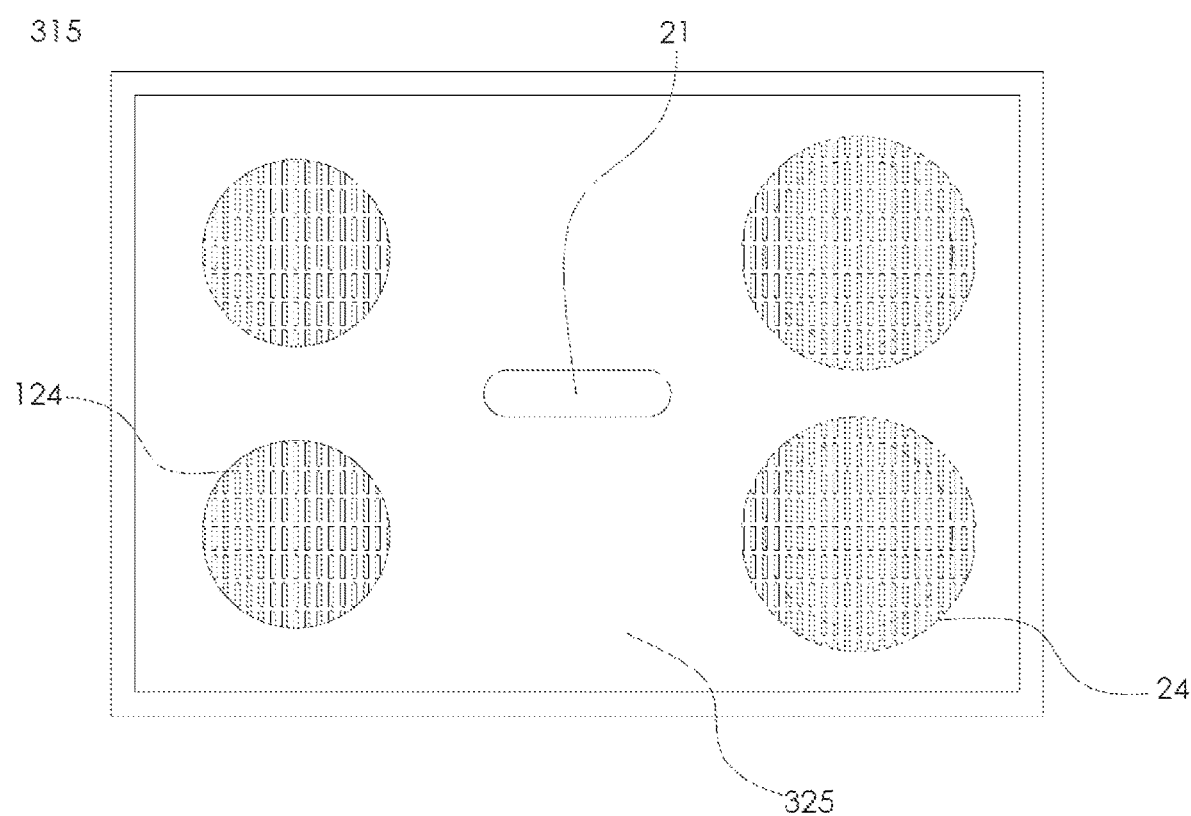
FIG. 12 shows a top view of the embodiment of FIG. 7.
Figure 13:
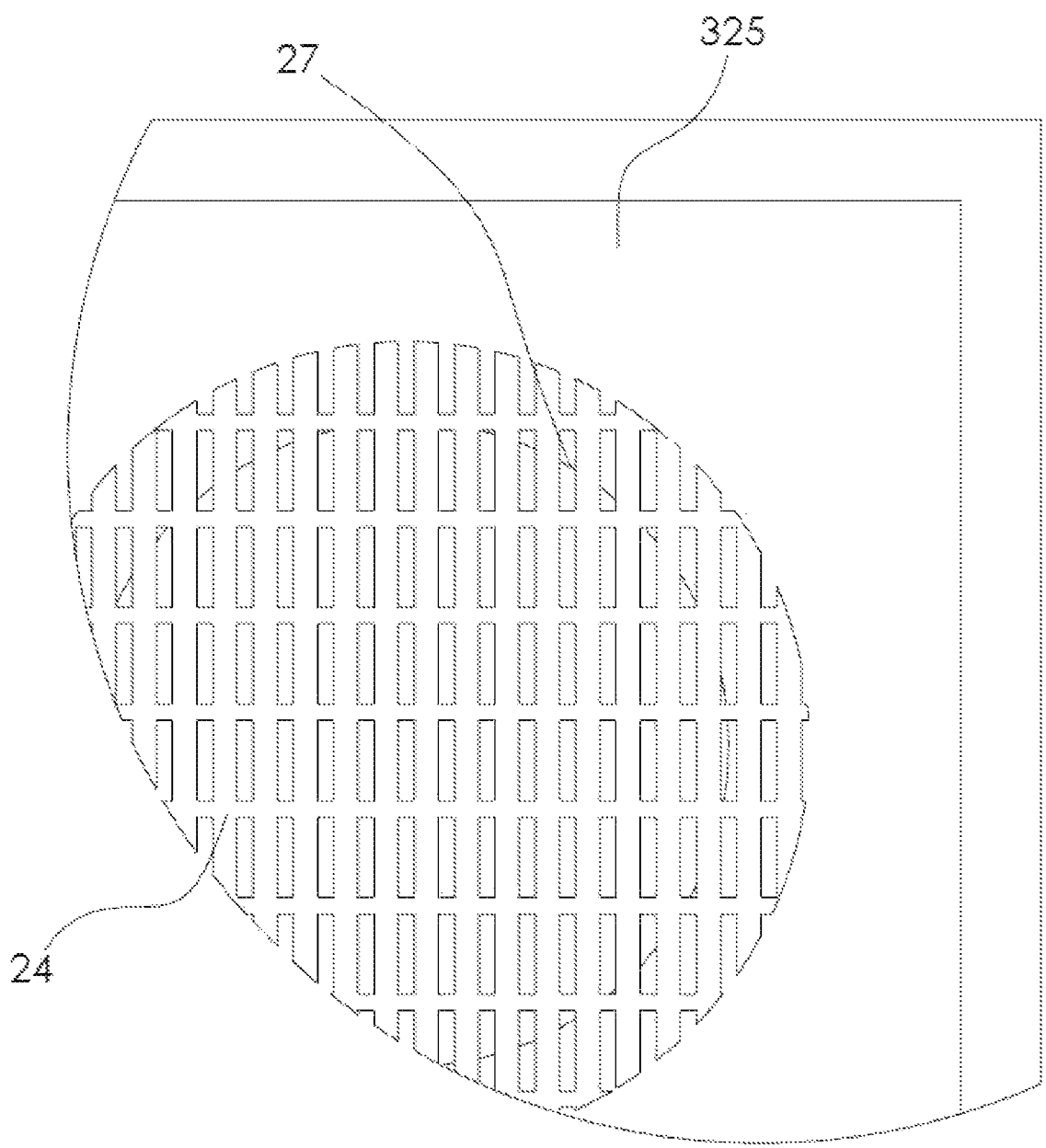
FIG. 13 shows a detail view of the top view of FIG. 12.

FIG. 9 shows a top view of the embodiment of FIG. 4. FIG. 10 shows a top view of the embodiment of 2. FIG. 11 shows a top view of the embodiment of FIG. 6. FIG. 12 shows a top view of the embodiment of FIG. 7. FIG. 13 is a detail view of the top view from FIG. 12. As can be seen in the exemplary embodiment shown in FIG. 13, the openings 27 do not need to match the sizing and coverage of the screening material 24. If the screening material 24 is sized and shaped so as to completely cover the openings 27, the screening material 24 may be oversized in relation to the openings 27, so as to allow for the use of staples, glue, or other adhesion or attachment means to connect the screening material 24 to the base 325.

Figure 14:
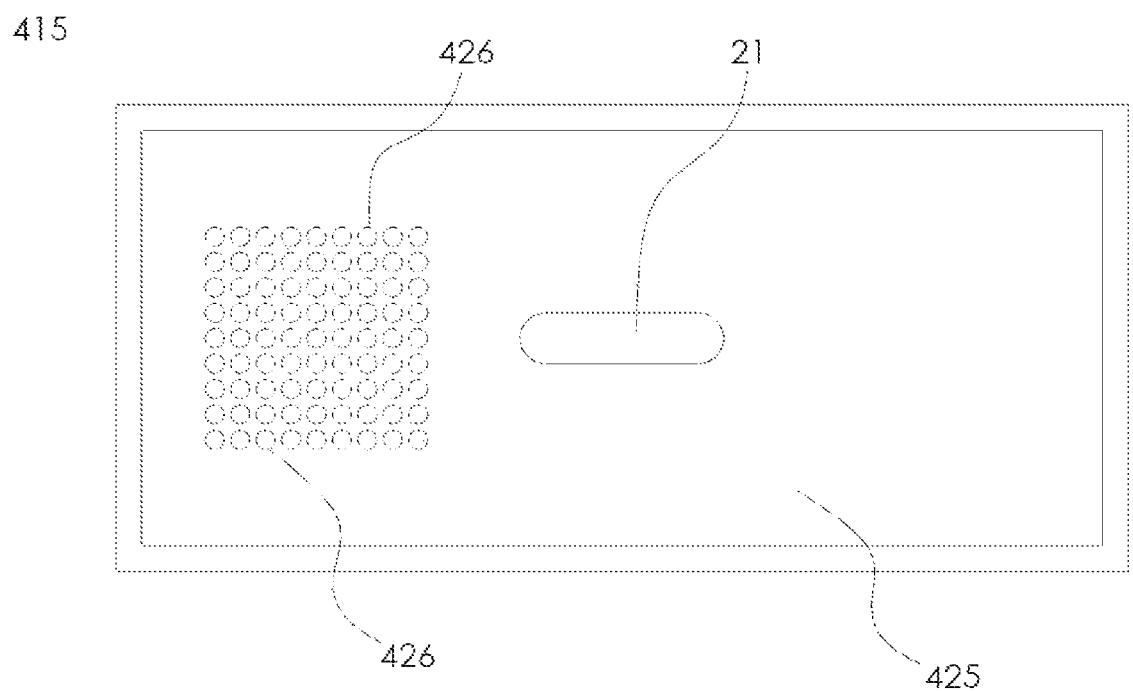
FIG. 14 shows a top view of the embodiment of FIG. 8.

FIG. 14 shows a top view of the embodiment of FIG. 8.

While multiple embodiments have been set forth for purposes of illustration, the foregoing description should not be deemed a limitation of the invention herein. Accordingly, various modifications, adaptations and alternatives may occur to one skilled in the art without departing from the spirit of the invention and scope of the claimed coverage.

What is claimed is:

1. An inner cover for a beehive, comprising:
   a base with a top surface and a bottom surface;
   a band of material which has a height which is not greater than 2.5 inches, and which projects substantially away from the top surface of the base;
   at least one central opening defined by the base, which is configured to facilitate the movement of bees between the top surface of the base and the bottom surface of the base;
   at least one direct access opening defined by a sidewall of the band of material, the at least one direct access opening configured so as to permit passage of bees between an inner volume of the inner cover and an outside of the band of material; and
   at least four circular openings defined by the base, the at least four circular openings configured to permit the flow of air between the top surface of the base and the bottom surface of the base, and configured to prevent the movement of bees between the top surface of the base and the bottom surface of the base; and
   wherein the band of material and the top surface of the base define the inner volume of the inner cover.

2. The inner cover according to claim 1, further wherein the base is substantially rigid having a thickness of at least a quarter inch.

3. The inner cover of claim 1, further wherein at least one of the at least four circular openings is at least partially covered by a screening material thereby preventing the movement of bees between the top surface of the base and the bottom surface of the base therethrough.

4. The inner cover of claim 3, further wherein the screening material defines a plurality of openings which are sized to enable selective blocking of the plurality of openings by bees through the use of propolis or beeswax.

5. The inner cover of claim 3, further wherein the screening material is substantially rigid.

6. The inner cover of claim 1, wherein a diameter of the at least one direct access opening defined by the sidewall of the band of material is 7/16".

7. The inner cover of claim 3, further wherein the screening material is configured so as to be selectively and repeatably blockable and unblockable by bees through the use of propolis or beeswax.

8. The inner cover of claim 3, further wherein the screening material is at least partially coated with a coating material so as to minimize direct contact between the screening material and bees within the beehive.

9. The inner cover of claim 1, further wherein the band of material is made from one or more individual pieces of wood.

10. The inner cover of claim 1, further wherein the height of the band of material is configured so as to permit the storage of nutrients for bees within the inner volume of the inner cover and is also configured so as to prevent bees from being able to create a comb in the inner volume of the inner cover.

11. The inner cover of claim 1, further wherein the height of the band of material is at least 5/4".

12. The inner cover of claim 1, further wherein the base defines one or more openings which are sized so as to be selectively and repeatably blockable and unblockable by bees through the use of propolis or beeswax.

13. The inner cover of claim 1, further wherein the base defines one or more groupings of openings which are sized so as to be selectively and repeatably blockable and unblockable by bees through the use of propolis or beeswax.

14. The inner cover of claim 10, further wherein the band of material defines four direct access openings which are sized so as to permit passage of bees between the inner volume of the inner cover and outside of the band of material.

15. A method of making an inner cover for a beehive, comprising:
   providing a substantially rigid base with a top surface and a bottom surface;
   providing at least one central opening defined by the base, which is configured to facilitate the movement of bees between the top surface of the base and the bottom surface of the base;
   providing at least four selectively blockable openings in the substantially rigid base, thereby creating a path for a flow of air between the top surface of the substantially rigid base and the bottom surface of the substantially rigid base; and
   providing a substantially rigid band of material projecting substantially away from the top surface of the substantially rigid base and defining an inner volume between the substantially rigid band of material and the top surface of the substantially rigid base, wherein a height of the substantially rigid band of material is not greater than 2.5 inches; and
   providing at least one direct access opening defined by a sidewall of the substantially rigid band of material, the at least one direct access opening configured so as to permit passage of bees between an inner volume of the inner cover and an outside of the band of material.

16. The method of claim 15, wherein the at least four selectively blockable openings in the substantially rigid base is sized so as to be selectively and repeatably blockable and unblockable by bees through the use of propolis or beeswax.

17. The method of claim 15, further comprising providing a screening material which at least partially covers at least one of the at least four selectively blockable openings in the substantially rigid base.

18. The method of claim 15, wherein the substantially rigid band of material projects between 1" and 3" away from the top surface of the substantially rigid base.

19. The method of claim 17, further wherein the screening material is configured so as to be selectively and repeatably blockable and unblockable by bees through the use of propolis or beeswax.

20. A level component for a beehive, comprising:
   a substantially rigid base with a top surface and a bottom surface; and
   a substantially rigid band of material which defines an inner volume between the substantially rigid band of material and the top surface of the substantially rigid base, wherein a height of the band of material is not greater than 2.5 inches;
   at least one central opening defined b the base which is configured to facilitate the movement of bees between the top surface of the base and the bottom surface of the base;
   at least two direct access openings defined perpendicular sidewalls of the band of material, the four direct access openings configured so as to permit passage of bees between an inner volume of the inner cover and an outside of the band of material, having a circumference of 7/16 of an inch; and
   four feeding openings being defined by the base, which each creates a flow path for air between the top surface of the substantially rigid base and the bottom surface of the substantially rigid base, and wherein the four feeding openings are at least partially covered by a screening material, further wherein the screening material is configured so as to be able to support the weight of pollen patties, and further wherein the screening material is sized and configured so as to be selectively and repeatably blockable and unblockable by bees through the use of propolis or beeswax.

* * * * *